US 6,405,307 B1

(12) United States Patent
Murty et al.

(10) Patent No.: US 6,405,307 B1
(45) Date of Patent: *Jun. 11, 2002

(54) APPARATUS AND METHOD FOR DETECTING AND HANDLING SELF-MODIFYING CODE CONFLICTS IN AN INSTRUCTION FETCH PIPELINE

(75) Inventors: Keshavram N. Murty, Phoenix, AZ (US); Nazar A. Zaidi, San Jose, CA (US)

(73) Assignee: Intel Corporation, Santa Clara, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/088,634

(22) Filed: Jun. 2, 1998

(51) Int. Cl.[7] ............................................. G06F 9/22
(52) U.S. Cl. ..................................................... 712/239
(58) Field of Search ................................. 712/237, 239

(56) References Cited

U.S. PATENT DOCUMENTS

| | | | | |
|---|---|---|---|---|
| 5,265,213 A | * | 11/1993 | Weiser et al. | 712/240 |
| 5,377,336 A | * | 12/1994 | Eickenmeyer et al. | 712/207 |
| 5,430,851 A | * | 7/1995 | Hirata et al. | 712/212 |
| 5,467,473 A | * | 11/1995 | Kahle et al. | 712/23 |
| 5,467,476 A | * | 11/1995 | Kawasaki | 712/23 |
| 5,692,167 A | * | 11/1997 | Grochowski et al. | 712/226 |
| 5,742,791 A | * | 4/1998 | Mahallingaiah et al. | 712/205 |
| 5,742,804 A | * | 4/1998 | Yeh et al. | 712/237 |
| 5,835,949 A | * | 11/1998 | Quattromani et al. | 711/135 |
| 5,860,017 A | * | 1/1999 | Sharangpani et al. | 712/23 |
| 5,867,701 A | * | 2/1999 | Brown et al. | 712/248 |
| 5,913,049 A | * | 6/1999 | Shiell et al. | 712/215 |
| 5,954,812 A | * | 9/1999 | Shiell et al. | 712/39 |
| 6,009,516 A | * | 12/1999 | Steiss et al. | 712/244 |

* cited by examiner

Primary Examiner—David Y. Eng
(74) Attorney, Agent, or Firm—Blakely, Sokoloff, Taylor & Zafman LLP

(57) ABSTRACT

A system and method are described for detecting and recovering from self-modifying code (SMC) conflicts. In one embodiment, detection is accomplished by accessing the contents of a memory, configured to contain a number of recently executed instructions, to obtain an address. This address is compared to information propagating through a front-end pipeline of an instruction pipeline. The instruction pipeline includes the front-end pipeline to support loading and propagation of information through the instruction pipeline and a back-end pipeline to support execution of instructions along with writeback to the memory. If the address matches the information propagating through the front-end pipeline, a SMC conflict has occurred and at least some of the pipelined information is invalidated.

25 Claims, 10 Drawing Sheets

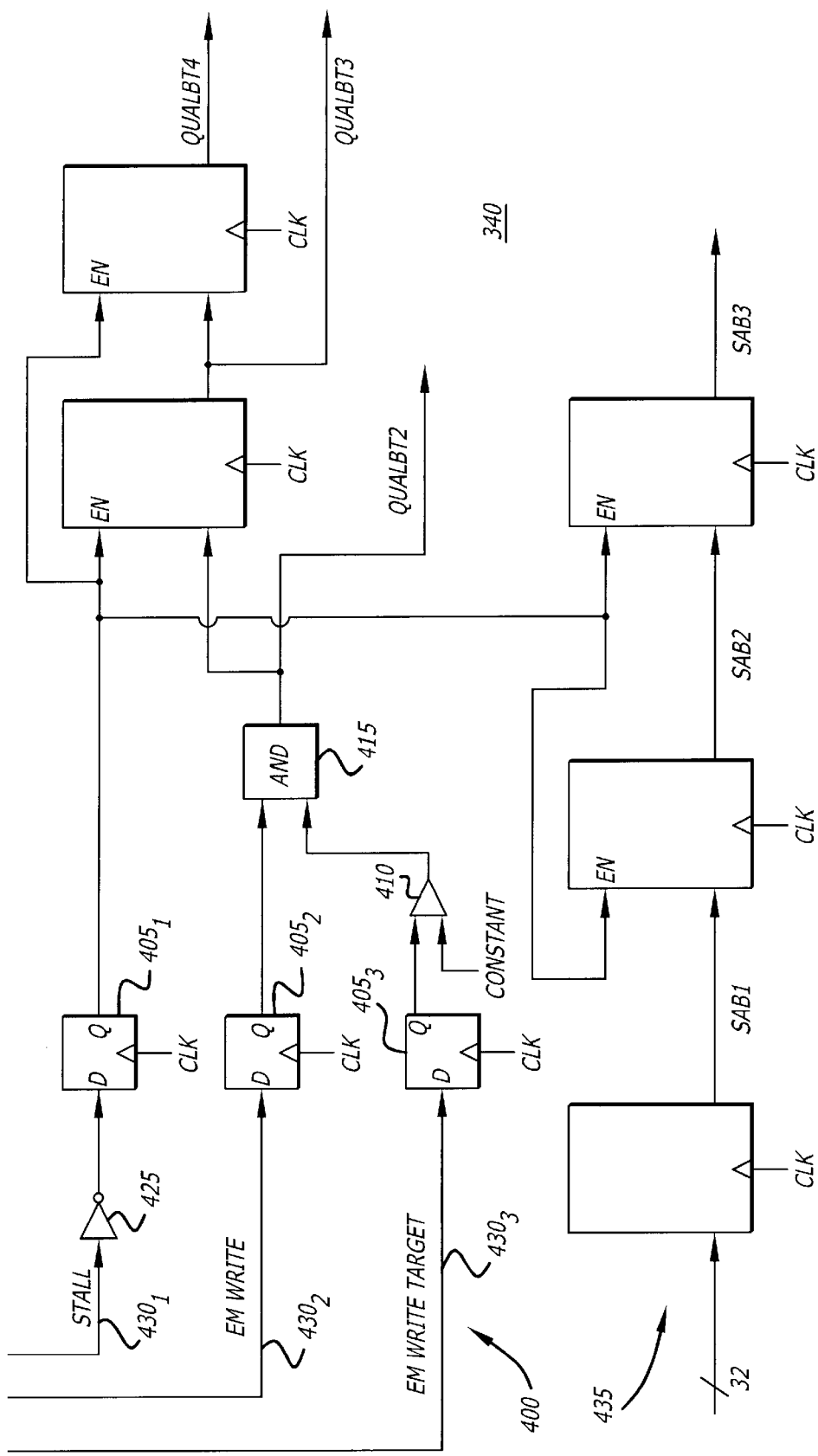
FIG. 4B_1

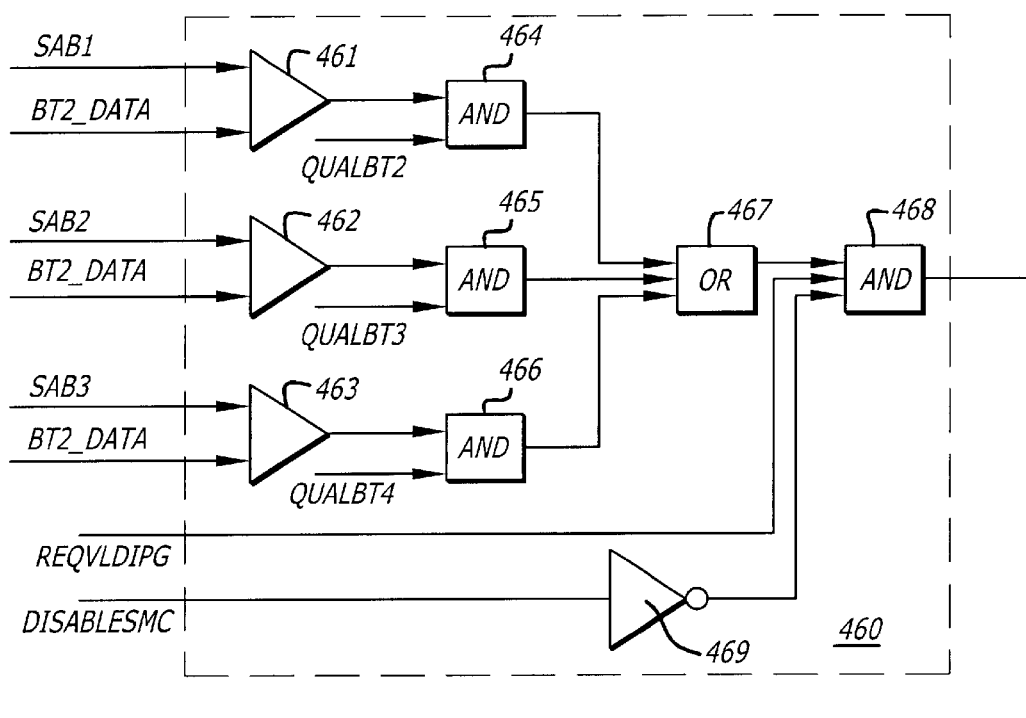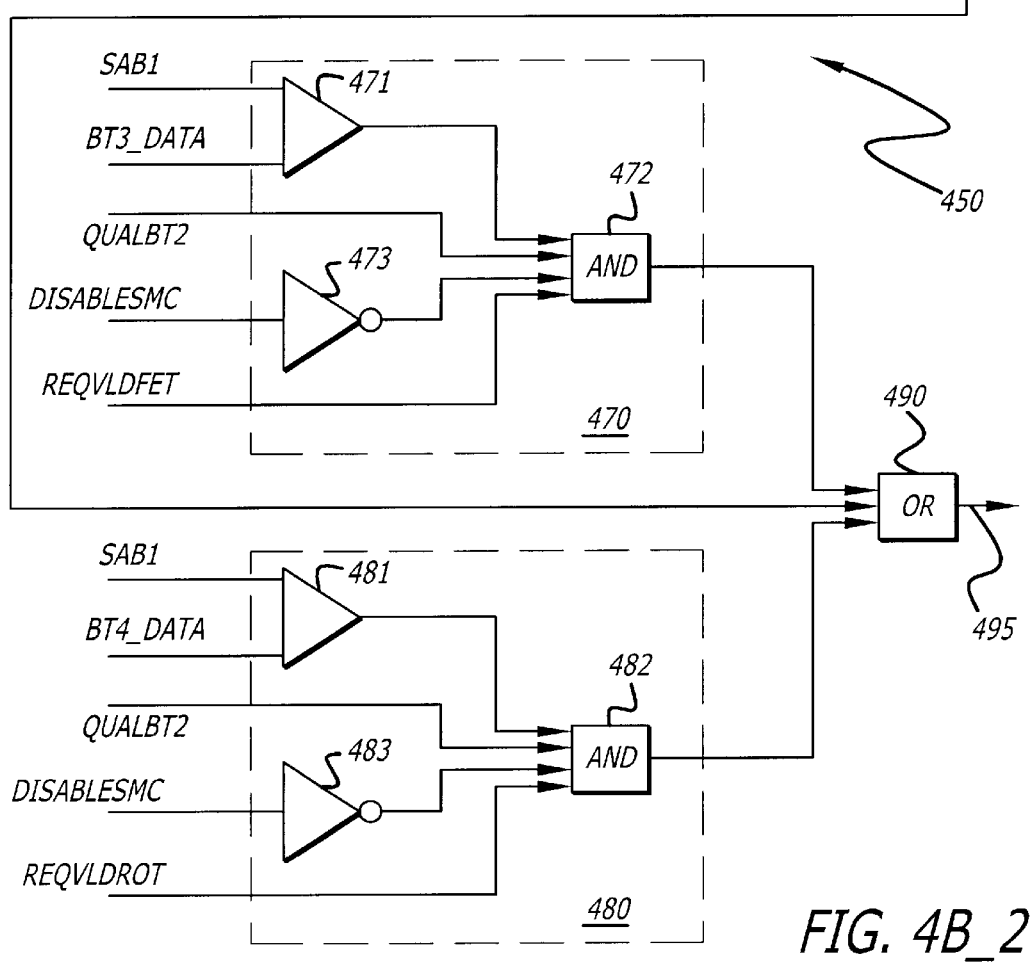
FIG. 4B_2

| CYCLE | IIP bt1 | IPG bt2 | FET bt3 | ROT bt4 | COMMENTS |
|---|---|---|---|---|---|
| 1 | D<br>D | C<br>C | B<br>B | A<br>A | Both pipelines are running synchronously. |
| 2 | E<br>E | D<br>Dsmc | C<br>Csmc | B<br>Bsmc | Logic circuitry associated with IVE front-end has detected a SMC conflict on IP "D" or IP "C" or IP "B". All shown as "SMC hits" just for simplicity. |
| 3 | F<br>F | E<br>E | D<br>D | C<br>C | IP "B" progresses to the IAU, but it will be marked as invalid to prevent decoding or execution. Contents of the bt2-bt4 stages are invalidated (X) in the next cycle. |
| 4 | B<br>B | E<br>X | D<br>X | C<br>X | Flush signal sent to EM; the IP "B" (the oldest IP when the SMC conflict occurred) is restarted in the pipelines. |
| 5 | C<br>C | B<br>B | X<br>X | X<br>X | IP C reloaded. |
| 6 | D<br>D | C<br>C | B<br>B | X<br>X | IP D reloaded |
| 7 | E<br>E | D<br>D | C<br>C | B<br>B | This is the same state of IPs in cycle 2 but this time the SMC hit conflict will probably not happen. If it does, the same process will be repeated. |
| | • | • | • | • | |
| | • | • | • | • | |
| | • | • | • | • | |

*FIG. 6*

| CYCLE | IIP bt1 | IPG bt2 | FET bt3 | ROT bt4 | COMMENTS |
|---|---|---|---|---|---|
| 1 | D | C | X | X | FET, ROT are invalid when a SMC conflict is detected which prevents the flush (and resteer) condition from occurring. State machine gets set. |
|   | D | Csmc | X | X | |
| 2 | E | D | C | X | State machine remembers that an SMC conflict occurred and a resteer needs to happen. |
|   | E | D | C | X | |
| 3 | F | E | D | C | State machine resets after it attaches an SMC event to the first valid IP coming into ROT stage; namely, IP "C". Now IP "C" will get recovered by reloading into the front-end pipelines. Invalidate IP "C" before sending to the IAU. |
|   | F | E | D | Csmc | |
| 4 | G | F | E | D | Invalidate IP "D" for IAU. |
|   | G | F | E | D | |
| 5 | C | G | F | E | Flush condition to occur to invalidate younger IPs (E, F, G) flush to EM. IP "C" is recovered. |
|   | C | X | X | X | |
| 6 | D | C | X | X | Pipelines recovered from the SMC conflict |
|   | D | C | X | X | |
|   | • | • | • | • | |
|   | • | • | • | • | |
|   | • | • | • | • | |

*FIG. 7*

| CYCLE | IIP bt1 | IPG bt2 | FET bt3 | ROT bt4 | COMMENTS |
|---|---|---|---|---|---|
| 1 | C<br>C | B/A<br>Bsmc | X<br>A | X<br>X | Pipeline stalled since MIQ is full (MIQ_FULL is active). SMC conflict detected for IP "B"; set state machine to remember SMC conflict. |
| 2 | C<br>C | B/A<br>B | X<br>A | X<br>X | MIQ_FULL is inactive (stall goes away); State machine remembers and waits until a valid IP comes to the ROT stage. |
| 3 | C<br>C | B<br>B | A<br>A | X<br>X | EM synchs up with IVE. State machine still set. Waiting for valid IP to get to the ROT stage. |
| 4 | D<br>D | C<br>C | B<br>B | A<br>A | Since a valid IP has reached the ROT stage, IP "A" will get recovered even though IP "B" had the SMC conflict. |
| | • | • | • | • | |
| | • | • | • | • | |
| | • | • | • | • | |

FIG. 8

APPARATUS AND METHOD FOR DETECTING AND HANDLING SELF-MODIFYING CODE CONFLICTS IN AN INSTRUCTION FETCH PIPELINE

BACKGROUND

1. Field

The present invention relates to the field of electronics. More specifically, the invention relates to an apparatus and method for detecting and handling self-modifying code conflicts.

2. General Background

Early microprocessors featured circuitry arranged to successively fetch and execute instructions. More specifically, each instruction pointer (IP), identifying a line of memory in which an instruction is stored, is fetched and placed in an instruction fetch pipeline. The instruction fetch pipeline is comprised of a number of processing stages in which the first few processing stages are referred to as a "front-end pipeline" and remaining processing stages are referred to as a "back-end pipeline". Since "in-flight" IPs are loaded into the front-end pipeline where instructions associated with these IPs are subsequently executed at the back-end pipeline, the in-flight IPs are subject to self-modifying code (SMC) conflicts.

A "SMC conflict" is a condition where the execution of an instruction of an executable program causes self-modification of that executable program. This self-modification may lead to the execution of "stale" data. In particular, a SMC conflict may occur for a number of reasons including, for example, those instances when a new instruction is created or when data embedded into the instruction of a repeatedly executed program is modified. Thus, various SMC handling techniques have been adopted.

Over the last few years, SMC conflicts have been handled through a variety of techniques. For example, for the i80486™ microprocessor produced by Intel Corporation of Santa Clara, Calif., a branch instruction was coded to follow a write instruction to program memory. This branch instruction caused the entire instruction pipeline to be flushed. Unfortunately, the insertion of branch instructions tends to be extremely inefficient, especially for pipelined processors since a complete pipeline flush would invalidate information stored in several queues.

With respect to the PENTIUM® microprocessor, the branch instruction technique was not utilized; instead, each in-flight instruction associated with a SMC conflict is detected and marked since the pipeline had only a few stages. The marked instruction is passed to an execution stage of the pipeline, at which time, the pipeline and those queues on the pipeline are flushed.

Another technique, utilized by the PENTIUM® PRO microprocessor, requires the use of an instruction victim cache (IVC) in combination with a normal instruction cache (I-cache) to guarantee that all of the instructions in the pipeline would be resident in one of these caches. However, management logic of these caches would unnecessarily complicate the cache architecture of the microprocessor and would provide a less than optimal solution for SMC conflict detection.

Hence, it would be advantageous to provide an apparatus, system and method to detect and clear SMC conflicts associated with the front-end portion of an instruction fetch pipeline and to provide a scheme after the occurrence of the SMC conflict to regain synchronization of the multiple front-end pipelines to each other.

SUMMARY OF THE INVENTION

Briefly, in one embodiment, a method is described for detecting and recovering from self-modifying code conflicts. The method comprises comparing an address with information progressing through a front-end pipeline of an instruction pipeline. If the address compares with information progressing through the front-end pipeline, a selection portion of the information is invalidated.

BRIEF DESCRIPTION OF THE DRAWINGS

The features and advantages of the present invention will become apparent from the following detailed description of an embodiment of the present invention in which:

FIGS. 4A, 4B-1 and 4B-2 are illustrative embodiments of the front-end SMC support logic implemented within the microprocessor of FIG. 1.

FIG. 6 is an illustrative embodiment of the SMC handling technique and synchronization scheme.

FIG. 7 is an illustrative embodiment of the SMC handling technique when the content in the ROT stage is invalid and a SMC conflict is detected.

FIG. 8 is an illustrative embodiment of the SMC handling technique when the MIQ is full and a SMC conflict is detected.

DESCRIPTION OF AN EMBODIMENT OF THE INVENTION

Embodiments of a system and method for detecting and handling self-modifying code (SMC) conflicts in an instruction fetch pipeline are described. In one embodiment, detection is accomplished by receiving a store address from circuitry responsible for instruction execution, and comparing the store address to information progressing through the front-end pipeline. Due to system latency, the store address is compared with in-flight instruction pointers (IPs) in the front-end pipeline and with the contents of a storage unit referred to as a "store address buffer" (SAB) described below. Herein, in this embodiment, the "front-end pipeline" includes the first few processing stages (e.g., the first four processing stages "bt1–bt4"), although different processing stages may be used.

Herein, a number of terms are frequently used to describe various hardware and functionality. For example, "information" includes data, validity, address, control or any combination thereof. In this embodiment, the address may include an "instruction pointer" (IP) which identifies a line of memory in which an instruction is stored. Herein, examples of an "IP" includes a $2^x$-bit pointer (normally "x"$\geq$5) or a line address including a predetermined number of the most significant bits of the pointer. A "pipeline" features circuitry successively staged to process information in an efficient manner in order to provide greater throughput. The terms "younger" and "older" for IPs are used to indicate whether an IP has been inserted into a pipeline after or before another IP, respectively.

With respect to hardware, a "microprocessor" is a single integrated circuit (IC) or multiple ICs having information processing capabilities such as, for example, a general purpose microprocessor, microcontroller, state machine, programmable logic device. An "electronic system" is broadly defined as any product featuring a microprocessor such as any type of computer (e.g., desktop, laptop, handheld, server, mainframe, etc.), a wireless telephone, an imaging device (e.g., digital camera, printer, scanner, etc.) and other products. A "signal line" is broadly defined as any information-carrying medium such as one or more electrical wire(s), bus trace(s), fiber optic(s), wireless communication channel(s), cable, Plain Old Telephone System (POTS) and the like.

Figure 1:
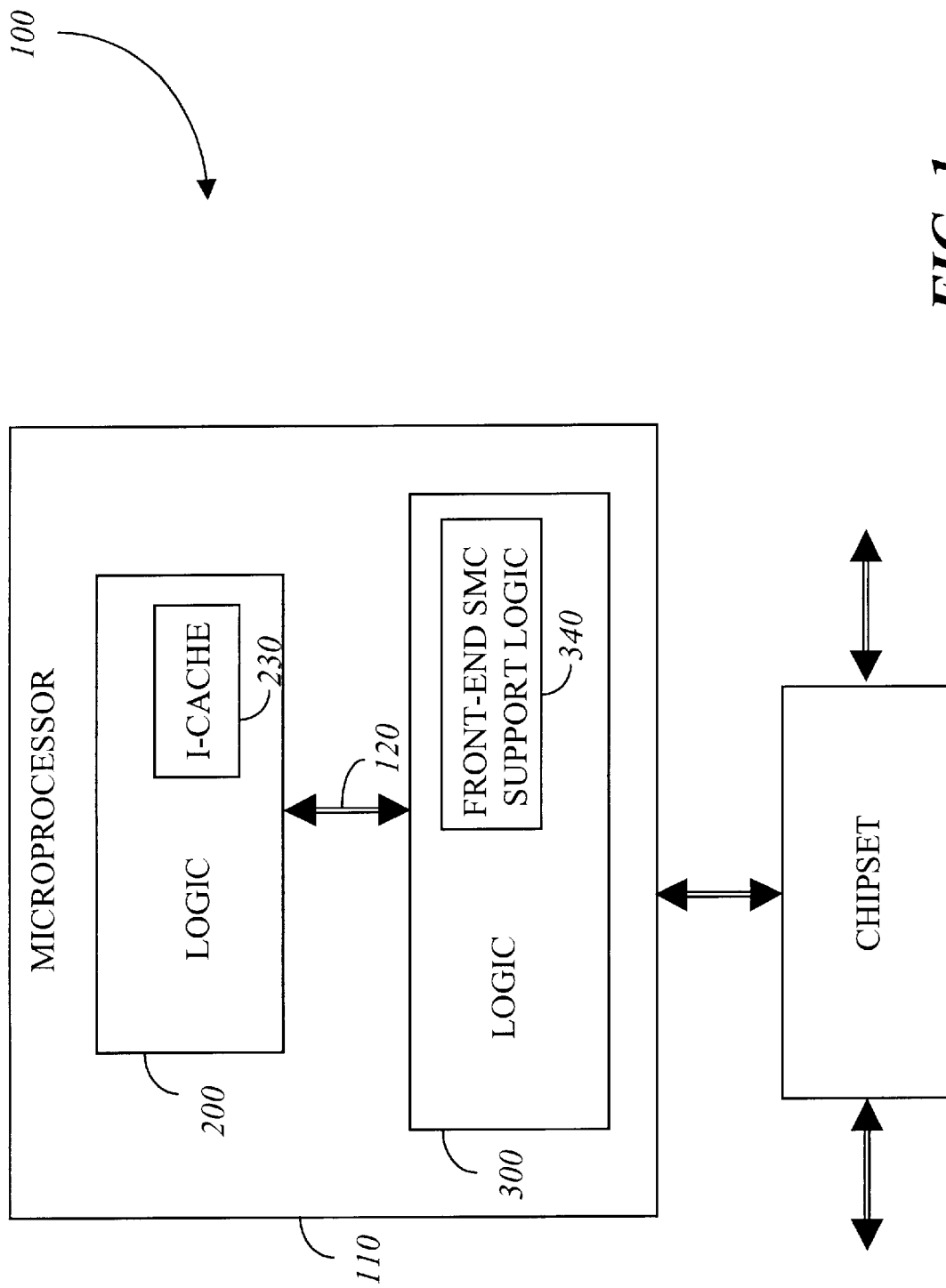
FIG. 1 is a block diagram of an electronic system implemented with a microprocessor adapted to handle SMC conflicts associated with multiple, parallel pipelines.

Referring to FIG. 1, an illustrative embodiment of an electronic system 100 featuring the present invention is shown. Electronic system 100 includes a microprocessor 110 which may be adaptive to a chipset. Microprocessor 110 includes circuitry associated with a first pipeline 200 (referred to as an Enhancement Mode "EM" pipeline) and circuitry associated with a second pipeline 300 (referred to as an INTEL® Value Engine "IVE" pipeline). These multiple, parallel pipelines 200 and 300 are coupled together through signal line 120 to concurrently perform various operations.

Figure 2:
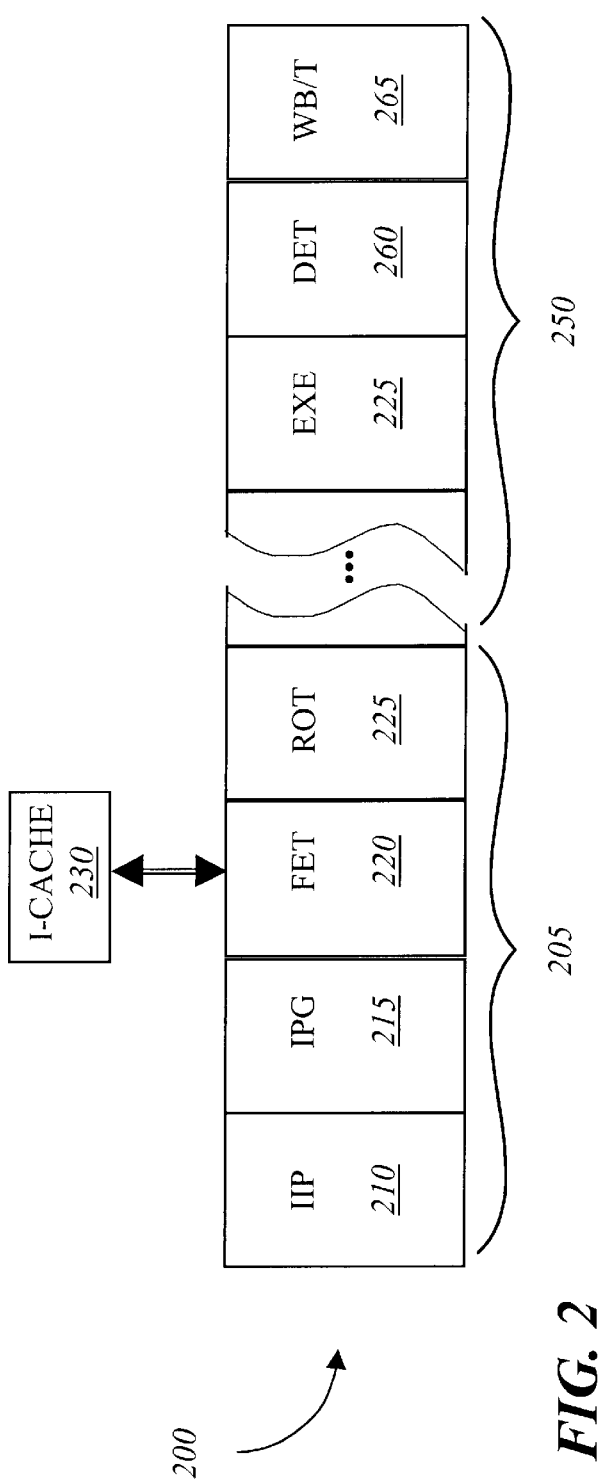
FIG. 2 is an illustrative embodiment of front-end and back-end pipelines of an EM pipeline utilized by the microprocessor of FIG. 1.

For example, as shown in FIG. 2, one embodiment of EM pipeline 200 includes a front-end portion 205 and a back-end portion 250. The front-end EM pipeline 205 is responsible for instruction fetching. The back-end EM pipeline 250 is responsible for successive execution of both the fetched instructions and cache writeback operations. As shown in FIG. 2, for example, front-end EM pipeline 205 includes, in succession, an Input Instruction Pointer (IIP) stage 210, an Instruction Pointer Generation (IPG) stage 215, a Fetch (FET) stage 220 and a Rotate (ROT) stage 225.

In particular, IIP stage 210 is responsible for receiving and loading an instruction pointer (IP) into front-end EM pipeline 205. During FET stage 220, an in-flight IP is used to fetch information (e.g., opcode) from an instruction cache (I-cache) for example. One embodiment of I-cache is a four-way, set associative cache memory that is responsible for temporarily containing opcode (e.g., instructions forming an executable program).

Figure 3:
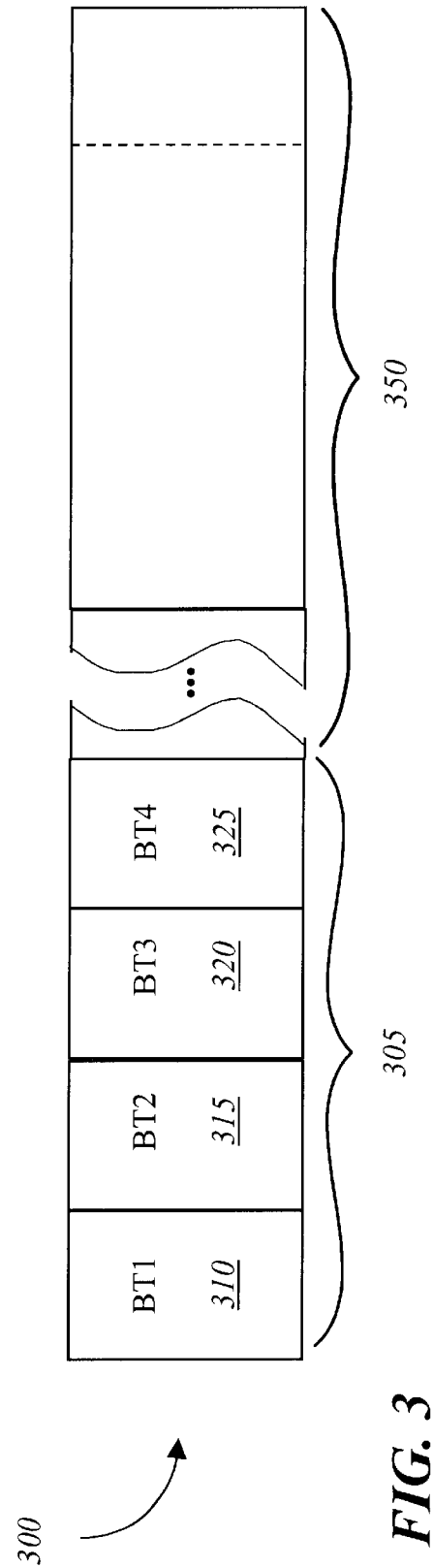
FIG. 3 is an illustrative embodiment of front-end and back-end pipelines of an IVE pipeline utilized by the microprocessor of FIG. 1.

Referring now to FIG. 3, one embodiment of IVE pipeline 300 includes a front-end IVE pipeline 305 and a back-end IVE pipeline 350. The front-end IVE pipeline 305 includes a plurality of processing stages, which correspond to those stages of front-end EM pipeline 205. These processing stages of front-end IVE pipeline 305 include (i) a first branch target "bt1" stage 310, (ii) a "bt2" stage 315, (iii) a "bt3" stage 320 and (iv) a "bt4" stage 325. Similarly, during bt1 stage 310, an IP (identical to the one entering front-end EM pipeline 205) is loaded into front-end end IVE pipeline 305. The remaining processing stages (bt2, bt3 and bt4 stages) 315, 320 and 325 are used to stage IPs transferring through both front-end EM/IVE pipelines 205 and 305.

Referring back to FIG. 2, back-end EM pipeline 250 includes an execution (EXE) stage 255, a Detection (DET) stage 260 and a Writeback/Transmit (WB/T) stage 265. During EXE stage, the target address of the store instruction currently being executed (referred to as the "store address") is transferred to a store address buffer (SAB) located inside WVE pipeline 305 of FIG. 3 as well as to comparison logic for comparison with the IPs progressing through IVE pipeline. In this embodiment, SAB is a 3-deep first-in, first-out (FIFO) which holds the addresses of the last three instructions executed. Of course, the sizing of the FIFO may be varied depending on cost and system constraints. While this comparison is directed to distinct logic forming SAB due to architectural constraints of microprocessor 110 of FIG. 1, it is contemplated that the comparison could be directed to a single memory architecture, provided that architecture had access to the stored contents of the latches associated with the bt2–bt4 stages.

During WB/T stage 265, the results of the comparisons are provided to EM pipeline 200 as evidenced by invalidation of IPs in the IPG, FET and ROT stages 215, 220 and 225 in the front-end EM pipeline 205 and by activation of a FLUSH signal to undergo a resteer condition for both front-end EM/IVE pipelines 200 and 300. Herein, the "FLUSH" signal is generally described as a control signal which indicates that a resteer condition, an intended deviation in sequential instruction flow, is to occur. This can lead to the invalidation of information in front-end EM pipeline 205.

In accordance with FIGS. 1–3, when microprocessor 110 is placed in an IVE mode, the state of validity of each stage of IVE pipeline 300 represents the state of a corresponding stage in EM pipeline 200. For example, during IVE mode, if information associated with bt4 stage 325 is invalidated, information associated with the ROT stage 225 in EM pipeline 200 will not be utilized. Meanwhile, when microprocessor 110 is placed in an EM mode, the contents of IVE pipeline 300 are not utilized. Rather, only the contents supplied by EM pipeline 200 are used.

In general, a SMC conflict may occur upon detection of an attempt to dynamically modify an in-flight instruction or data embedded in that instruction. Such detection is accomplished by feedback of the store address at the EXE stage and comparing the store address to both in-flight IPs progressing through front-end IVE pipeline 305 and the contents of the SAB. These operations are performed by dedicated, front-end SMC support logic 340 (FIG. 1) which is located inside in IVE pipeline 300.

Figure 4A:
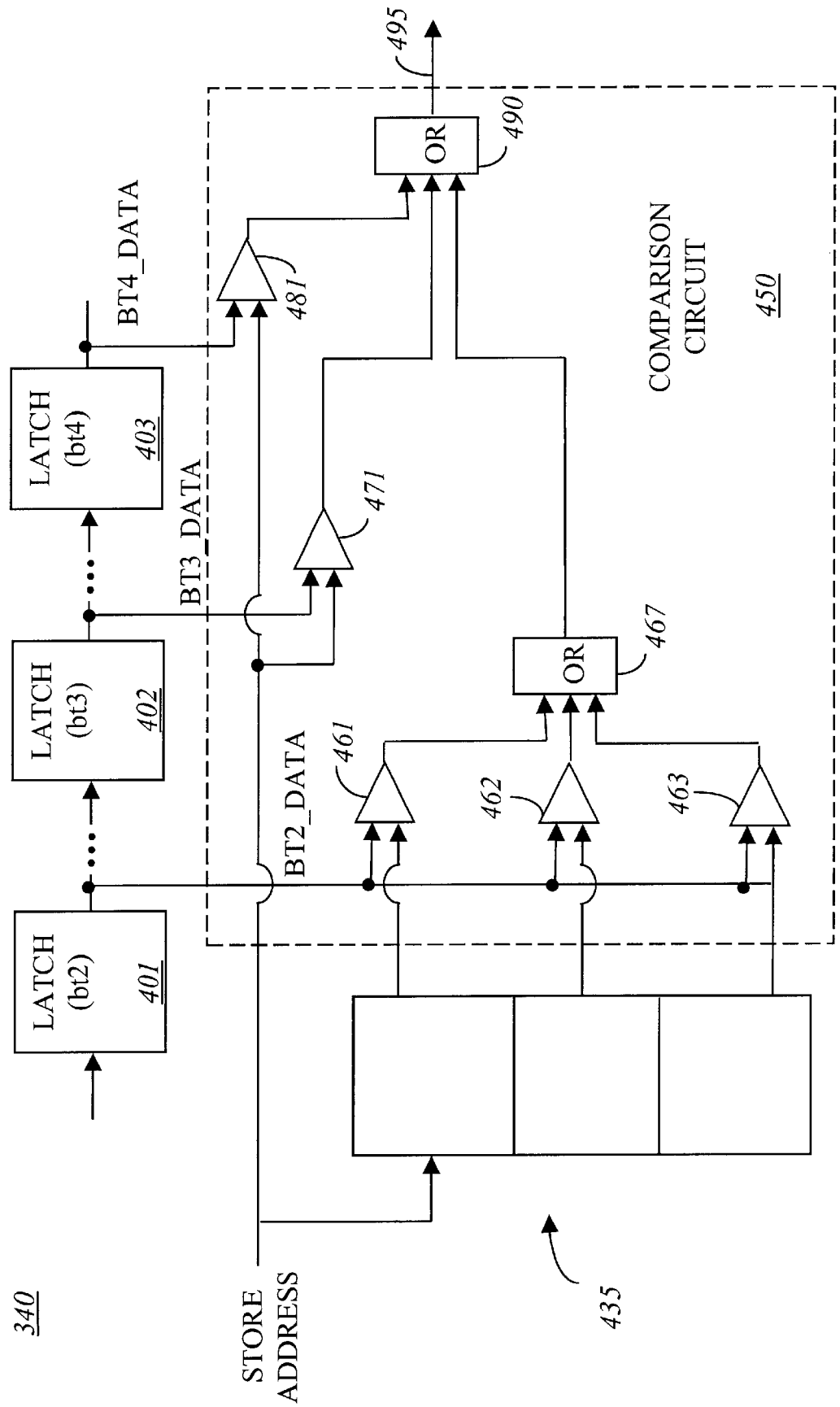

Referring now to FIGS. 4A and 4B (inclusive of 4B-1 and 4B-2), illustrative embodiments of front-end SMC support logic 340 is shown. As generally shown in FIG. 4A, front-end SMC support logic 340 comprises a store address buffer (SAB) 435 and a comparison circuit 450. Comparison circuit 450 comprises (i) a plurality of comparators 461–463, 471 and 481 and (ii) logic gates functioning as OR gates 467 and 490. SAB 435 includes a n-deep FIFO ("n" is a positive whole number). This FIFO is used to receive information, such as the store address from the EXE stage for the last "n" cycles.

As shown in FIG. 4A, the contents of SAB 435 are compared through comparators 461–463 with the contents of a latch 401 associated with the bt2 processing stage (referred to as a "bt2 latch"). If a match is detected by any of the comparators 461–463, a match signal is active by one or more logic gates functioning as a 3-input OR gate 467. This active match signal is provided to a logic gate 490 having OR'ing functionality, which signals that a SMC conflict exists by activating output signal line 495.

In addition, the contents of latches 402 and 403, which include the IPs associated with bt3–bt4 processing stages and are referred to as "bt3 latch" and "bt4 latch" respectively, are compared with the store address provided from the EXE stage. If a match is detected by comparators 471 or 481, an active match signal is provided to logic gate 490. This causes logic gate 490 to activate output signal line 495, signaling that a SMC conflict exists.

As shown in FIG. 4B, a detailed description of the illustrative embodiment of front-end SMC support logic 340 generally shown in FIG. 4A is shown. Adapted for use in monitoring the front-end IVE pipeline 305, front-end SMC support logic 340 includes a qualification circuit 400, SAB 435 and comparison circuit 450, all of which operate in tandem to detect and to signal via output signal line 495 that a SMC conflict is occurring. Herein, a SMC conflict is determined to occur if certain conditions are present. For example, one condition involves involve qualification circuit 400 monitoring for pending code (or data) modifications. Another condition involves comparison circuit 450 determining whether an address in SAB 435 and a valid IP in one of the bt2–bt4 stages of the front-end IVE pipeline match. Yet another condition involves a determination that the SMC support logic 340 is enabled.

In this embodiment, qualification circuit 400 includes a first set of latches $405_1$–$405_3$, a first comparison circuit 410, a first logic gate 415 and a second set of latches $402_1$–$402_2$ and an inverter 425. In general, a first latch $405_1$ and inverter 425 provide a circuit which stalls SAB 435 in the event of a stall condition in the back-end EM pipeline. The other circuitry of qualification circuit 400 produces control signals (labeled "QUALBT2", "QUALBT3" and "QUALBT4"), which indicate, for example, whether or not conditions for a SMC conflict currently exist in latches $440_1$–$440_3$ of SAB 435. If these conditions do not exist, a SMC conflict will not occur and the output signal line 495 is not activated.

Each of the first set of latches $405_1$–$405_3$ is featured as a D-type flip-flop having a single input and output, although other types of flip-flops may be used. The first set of latches $405_1$–$405_3$ are clocked by a common clock (CLK) to concurrently receive corresponding control signals over signal lines $430_1$–$430_3$. These control signals are referred to as a writeback stall (STALL) signal, an "EM WRITE" signal and an "EM WRITE TARGET" signal. The STALL signal, when active, 430 indicates that back-end EM pipeline has stalled. Herein, the STALL signal $430_1$ is inverted by inverter 425 and loaded into latch $405_1$ which, in a next clock cycle, is output as an inactive signal to disable latches $420_1$, $420_2$, $440_2$ and $440_3$. SAB 435 will remain in this stalled state until approximately one clock cycle after the STALL signal is deactivated.

The EM WRITE signal, when active, indicates that modification of an inflight instruction is pending. The EM WRITE TARGET signal provides an address of a register targeted to receive a copy of the modified code and/or data. This address is loaded into a first input of first comparison circuit 410 while a constant address of the targeted register is provided to a second input of first comparison circuit 410.

After a comparison is performed by first comparison circuit 410, an output signal is routed to a second input of logic gate 415. The output signal is active if the address of the register targeted to receive the copy of the modified code is identical to the selected register. If an active EM WRITE signal is provided along with the active output signal from first comparison circuit 410, logic gate 415 provides an active signal (QUALBT2) to indicate that the IP associated with the bt2 stage is qualified. The term qualified means that no stall condition is present and a writeback to D-cache is to occur.

Referring still to FIG. 4B, SAB 435 includes n-deep FIFO produced from latches $440_1$$440_n$ ("n" is a positive whole number; n=3 for this embodiment). These latches $440_1$–$440_n$ may be clocked by CLK, or perhaps another clocking signal. For this embodiment, a three-deep FIFO is chosen to receive information, such as the store addresses from the EXE stage for the last n (three) cycles. The contents of SAB 435 are compared with an address in the processing stage latches associated with the bt2–bt4 phases as described below.

The comparison circuit 450 includes three circuits 460, 470 and 480, each of which is responsible for detecting a SMC conflict. This is accomplished by configuring circuits 460, 470 and 480 to separately compare the contents in latches $440_1$–$440_3$ of SAB 435, qualified by QUALBT2-QUALBT4 signals, with the contents of the respective bt2–bt4 latches 401–403 of FIGS. 3 and 4A. The outputs of these circuits 460, 470 and 480 are separately connected to logic gate 490 functioning as a three-input OR gate as described. As a result, through address comparison, if any of these circuits detect that an in-flight IP is associated with an executed instruction being modified, front-end SMC support logic 340 will indicate that a SMC conflict exists by activating output signal line 495.

As shown in FIG. 4B, one embodiment of first circuit 460 includes comparators 461–463, logic gates functioning as dual input AND gates 464–466, a logic gate 467 functioning as a three-input OR gate, a logic gate 468 functioning as a three-input AND gate and an inverter 469. Comparators 461–463 determine whether any contents of a memory lines (e.g., SAB1, SAB2, SAB3) of SAB 435 match the IP associated with the bt2 processing stage. If there is a match and that bt2 stage is qualified, an active signal is sent to logic gate 467. This causes an active signal to be input into a first input of logic gate 468. Logic gate 468 further includes a second input to receive an inactive signal (REQVLDIPG) if the IPG stage has been invalidated and a third input to receive a disable signal (DISABLESMC) inverted by inverter 469. The invalidation may be caused by a prior resteer condition while the disable signal is active if it is desirous to disable front-end SMC support logic 340. If all of the signals applied to the first, second and third inputs of logic gate 468 are active, an active signal (STMATCHBT2) is applied to a second input of logic gate 490 which, in turn, would produce an active signal on output line 495.

A second circuit 470 includes comparator 471, a logic gate 472 functioning as a four-input AND gate and an inverter 473. Comparator 471 determines whether the contents of the most recent writeback of SAB 435 are equivalent to the contents found in the latch for the bt3 processing stage. If so, an active signal is sent to a first input of logic gate 472. Logic gate 472 further includes a second input to receive a control signal (QUALBT2) indicating the validity of the writeback IP to be considered for SMC conflict analysis, a third input to receive DISABLESMC inverted by inverter 473 and a fourth input to receive a control signal (REQVLDFET) indicating the validity of the FET stage. If all the signals applied to logic gate 472 are active, an active signal (S™ATCHBT3) is applied to a first input of logic gate 490 which, in turn, produce an active signal on output line 495.

A third circuit 480 includes comparator 481 and a logic gate 482 functioning as a four-input AND gate, and an inverter 483. Comparator 481 An determines whether the contents placed in SAB 435 of the most recent writeback are equivalent to the contents found in the latch associated with the bt4 processing stage. If a match is detected, an active signal is sent to a first input of logic gate 482. Logic gate 482 further includes a second input to receive a control signal (QUALBT2) indicating the validity of the writeback IP to be considered for SMC conflict analysis, a third input to receive DISABLESMC inverted by inverter 483 and a fourth input to receive a control signal (REQVLDROT) indicating the validity of the ROT stage. If all the signals applied to logic gate 482 are active, an active signal is applied to a third input of logic gate 490 which, in turn, produces an active signal on output line 495.

Figure 5A:
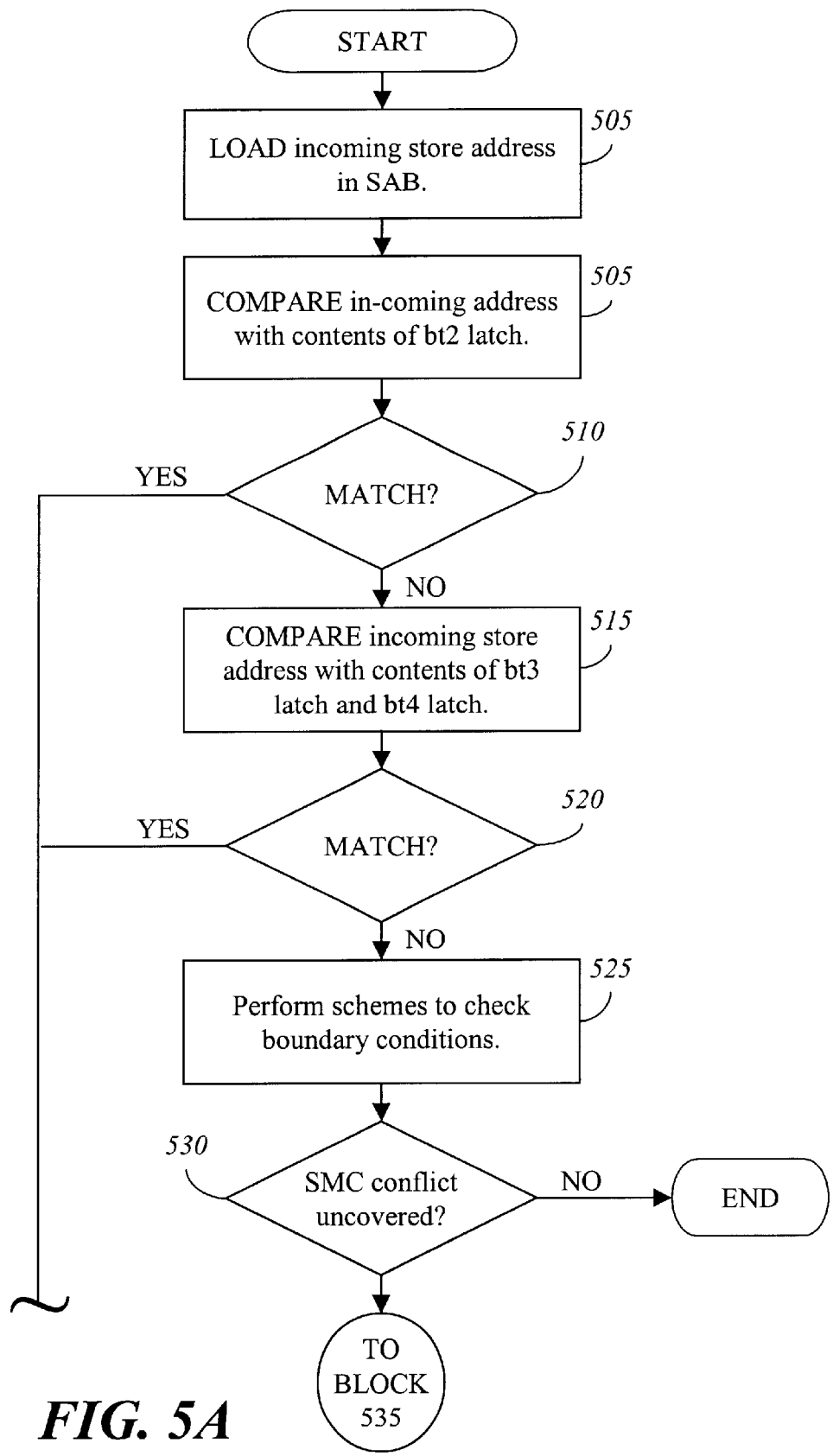
FIGS. 5A and 5B are illustrative flowcharts of an embodiment of operations performed by the microprocessor of FIG. 1 in detecting SMC conflicts and in handling SMC conflicts.
Figure 5B:
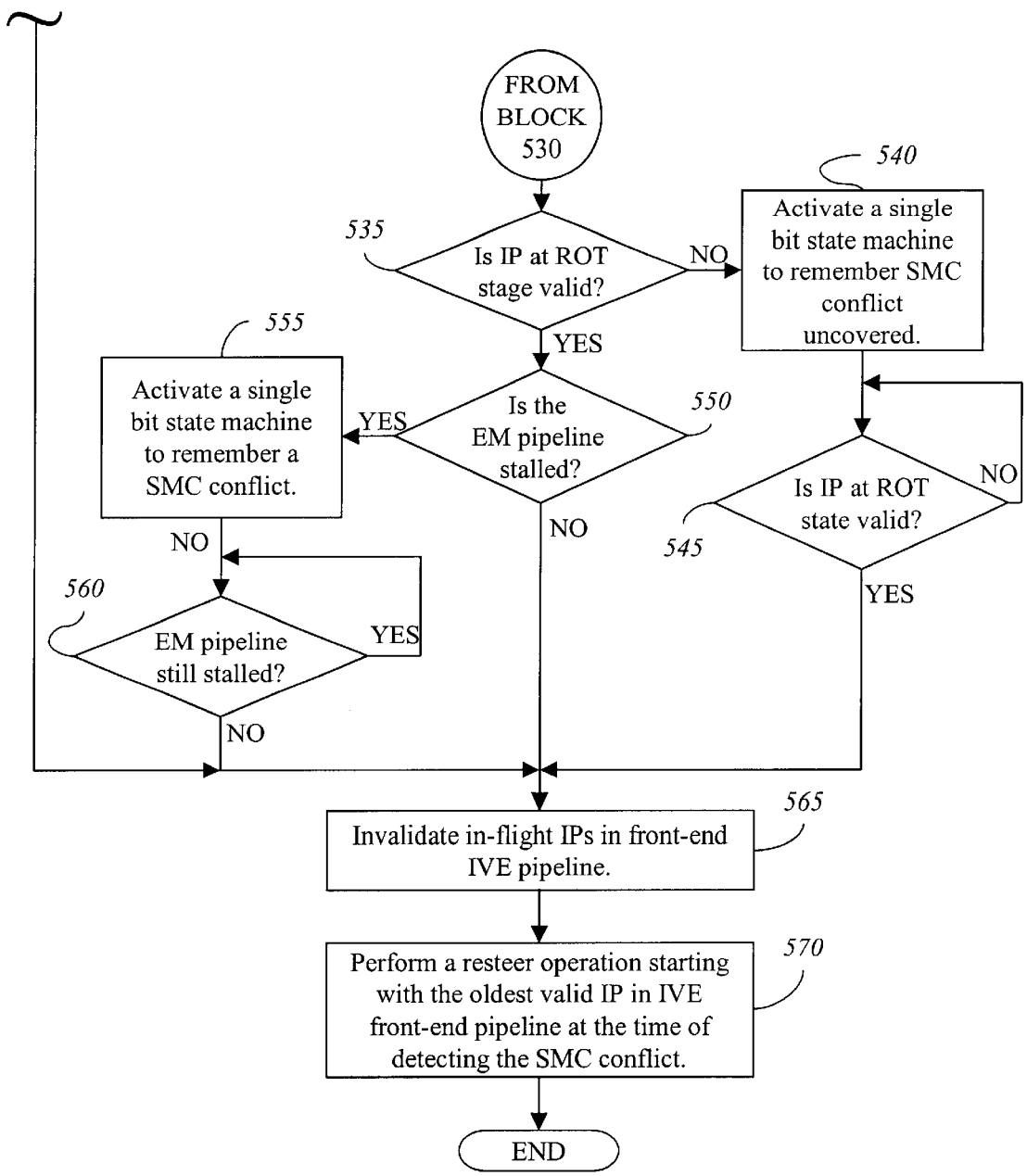

Referring now to FIGS. 5A and 5B, illustrative flowcharts featuring embodiments of the operations performed by microprocessor in detecting a SMC conflict and in handling the SMC conflict is shown. In this embodiment, the microprocessor initially undergoes an scheme to detect a SMC conflict during execution of an instruction associated with an in-flight IP. First, an in-coming store address is loaded into the SAB (block 500). Next, in block 505, the contents of the SAB are compared with the contents of the bt2 latch. In block 510, if the comparison is successful (i.e., a match is detected), a SMC conflict handling scheme is commenced (block 565). Otherwise, the contents of the bt3 latch and bt4 latch are compared with the incoming store address (block 515). Upon a successful comparison concerning the bt3–bt4 processing stages (block 520), the SMC conflict handling scheme is commenced (block 565). Otherwise, various schemes are performed to determine whether certain boundary conditions exist which may obfuscate a SMC conflict (blocks 525 and 530).

For example, one condition occurs at a boundary between the bt4 processing stage and an "ALN" processing stage. The reason is that an IP currently being written into a macro-instruction queue (MIQ) will be missed during a comparison between (i) an incoming store address and (ii) the contents of the bt2–bt4 latches. This boundary condition is handled by snooping a history buffer associated with the ALN processing stage. This history buffer is effectively a latch containing the IP currently being loaded into the MIQ.

Once a SMC conflict is detected, one or more operations are performed to determine whether there exists any conditions which would prevent the SMC conflict handling scheme from being performed at this time. One operation may involve determining whether the IP associated with the ROT stage is valid (block 535). If that IF is invalid, a single-bit state machine is activated in order to remember that a SMC conflict occurred (block 540). The SMC handling scheme is deferred until a valid IP reaches the ROT stage (block 545). Another operation involves determining whether the EM pipeline is stalled (block 550). If so, a single-bit state machine is activated in order to remember that a SMC conflict occurred (block 555). The SMC handling scheme is deferred until the EM pipeline is removed from its stalled condition and there is a valid IP in the ROT stage (block 560).

Once a SMC conflict is detected, it can be handled through a number of different embodiments for the SMC handling scheme. For example, one scheme is to invalidate all in-flight IPs in the front-end pipelines and to resteer the inflight IPs beginning with the oldest valid IP at the time the SMC conflict was detected (block 570). In this embodiment, the oldest valid IP will enter the WVE pipeline two cycles after the SMC conflict has been detected, due to system latency as shown in FIG. 6. By choosing to always resteer to the ROT stage, a significant amount of control and routing is saved at the expense of minimal performance loss. However, it is contemplated that recovery may be modified to recover only up to the in-flight IP which had the SMC conflict. This would require multiple resteer schemes for each processing stage of the front-end IVE pipeline.

Referring now to FIGS. 6–8, illustrative tables featuring the flow of information through the front-end processing stages of both the front-end EM pipeline and the front-end IVE pipeline during the SMC handling scheme and for exception cases are shown. Herein, information includes IPs which are represented as letters "A", "B", "C", "D" and "E". These IPs are sequential aligned IPs, where each IP is a result of incrementing a previous IP by a predetermined number of bytes (e.g., 32 bytes). For example, IP "B" is based on IP In a first cycle (cycle 1), both pipelines are operating synchronously. In a second cycle, the SMC handling circuit of FIG. 4 has detected an SMC conflict to occur for either IP "D", IP "C" or IP "B" and IP "B" had been invalidated before being sent to the IAU. For simplicity, all of these IPs are shown to be associated with the SMC conflict as denoted by the subscript label "SMC". In the third cycle, IP "C" is marked invalid. IP "B" and IP "C" have been marked invalid so that they will not be decoded or executed downstream in the IAU. This is because IP "B" will restart at the beginning of both pipelines.

Thereafter, in the fourth cycle, a front-end pipeline flush occurs and a FLUSH signal is sent to logic circuitry 130. The FLUSH signal indicates that a flush condition has occurred, which leads to the invalidation of information in front-end EM pipeline. The oldest IP at the time of the SMC conflict (IP "B") is reloaded into a first stage (IIP/bt1) of the front-end pipelines while the remainder of the processing stages in the front-end IVE pipelines are invalidated. This causes the invalidation of information within corresponding processing stages of the EM pipeline.

In the fifth and sixth cycles, IP "C" and IP "D" are reloaded into the front-end pipelines for synchronization of these pipelines. At the seventh cycle, the state of these front-end pipelines are synchronous and the SMC conflict has been avoided.

Referring now to FIG. 7, in the event that the ROT stage is invalid when a SMC conflict is detected, a scheme is used to remember the occurrence of the SMC conflict while deferring the SMC handling scheme. For example, suppose contents of the FET and ROT stages are invalid when a SMC conflict is detected as shown in cycle 1. A flush operation cannot occur since the IP in the ROT stage is invalid. Instead, a state machine is set to remember that a flush condition is to occur when a valid IIP is placed in the ROT stage.

In cycle 3, the state machine is reset after IP "C" is signaled to be associated with a SMC conflict. IP "C" is invalidated to avoid downstream decoding and execution in the back-end EM pipeline.

In cycle 4, IP "D" is also invalidated due to system latency in imposing a FLUSH condition during cycle 5. IP "C" is recovered and fetched for input into both pipelines while IPs associated with bt2–bt4 processing stages are invalidated.

Thereafter, IPs younger than IP "C" are recovered and IPs in the FET and ROT stages of the front-end EM pipeline are invalidated.

Referring now to FIG. 8, in the event that a SMC conflict is detected while the MIQ is full (a "MIQ_FULL" signal is activated) and cannot accept information returned to the FET stage from I-cache, a state machine is set (cycle 1). The state machine is reset once MIQ_FULL is inactive and a valid IP is placed in the ROT stage. In this embodiment, a queue is used for IP insertion into a selected processing stage of front-end EM pipeline such as the "IPG" stage. One embodiment of this queue, not shown, includes a multiplexer and a storage element. The multiplexer includes at least two inputs where one input is configured to receive the unqueued IP and the another input is connected to the storage element. The selection of the multiplexer is controlled from activation or deactivation of a stall condition by the EM pipeline. The storage element may include a buffer which contains a selected number of Ips. This allows the queue to hold at least two cycles worth of information in one front-end pipeline stage.

As further shown in FIG. 8, a full MIQ causes these front-end pipelines to become asynchronous to each other in which the front-end WVE pipeline leads the front-end EM pipeline by at least one cycle as shown. This asynchronous condition occurs due to signal latency between circuitry controlling the front-end pipelines. After the front-end EM/WE pipelines have undergone a flush condition and loaded with that IP for re-synchronization purposes. If the MIQ is still full after both front-end pipelines have undergone a flush condition, the stall condition remains active. Upon deactivation of the stall condition, the front-end EM pipeline continues propagation of information a predetermined number "t" of cycles (e.g., t>1) before the front-end IVE pipeline becomes active. This allows the front-end EM pipeline to again become synchronous with the front-end IVE pipeline. However, the state machine continues to be set and is only reset during cycle 4 where a valid IP "A" has reached the ROT stage. While IP "B" is responsible for the SMC conflict, recovering begins with IP "A" which is the oldest valid IP upon detecting the SMC conflict. Thus, IP "A" is invalidated before being input to the IAU stage.

It will be evident that various modifications and changes may be made to w the present invention without departing from the broader spirit and scope of the invention as set forth in the appended claims. The specification and drawings are, accordingly to be regarded in an illustrative rather than a restrictive sense.

What is claimed is:

1. A method comprising:
providing a first information pertaining to a first instruction being executed, the first information progressing over a back-end of a first instruction pipeline, the first instruction being a store instruction executed at a second instruction pipeline;
comparing the first information with a second information pertaining to a second instruction progressing through a front-end of the second instruction pipeline; and
invalidating a selected portion of information progressing through the front-end of the second instruction pipeline if the first information matches with the second information.

2. The method of claim 1 further comprising: reloading the selected portion of the information into the front-end of the second instruction pipeline.

3. The method of claim 2 wherein the second information includes an instruction pointer.

4. The method of claim 1, further comprising:
obtaining, prior to comparing, the first information from a store address buffer located at the back-end of the first instruction pipeline, the store address buffer being a first-in, first-out buffer containing information pertaining to at least last three instructions executed at the second instruction pipeline.

5. The method of claim 1, wherein the invalidating of the selected portion comprises
invalidating information contained in at least one pipeline stage of the front-end of the second instruction pipeline.

6. The method of claim 1, wherein the invalidating of the selected portion comprises invalidating information contained in each pipeline stage of the front-end of the second instruction pipeline.

7. The method of claim 1, wherein the front-end of the second instruction pipeline includes a first four processing stages.

8. A method comprising:
accessing contents of a memory configured to contain a target address of a recently executed store instruction, the target address being transferred to the memory in a back-end of a first instruction pipeline;
comparing the target address to information propagating through a front-end pipeline of a second instruction pipeline, the second instruction pipeline including the front-end pipeline to support both loading of the information into the second instruction pipeline and propagating of the information through the second instruction pipeline, the information including an instruction pointer; and
invalidating at least a portion of the information contained in the front-end pipeline of the second instruction pipeline when the target address matches the information propagating through the front-end pipeline of the second instruction pipeline.

9. The method of claim 8 further comprising:
reloading the portion of the information into the front-end pipeline of the second instruction pipeline.

10. A microprocessor comprising:
a first pipeline including a first front-end pipeline and a first back-end pipeline; and
a second pipeline including a second front-end pipeline and a second back-end pipeline, the second pipeline comprises a storage element including a store address buffer and logic circuitry to detect a self-modifying code conflict by comparing an address pertaining to a store instruction from the first back-end pipeline, loaded into the storage element to information propagating through the first front-end pipeline, the logic circuitry including a comparison circuit coupled to the store address buffer and adapted to compare the address to the information propagating through the second front-end pipeline, the comparison circuit comprises (i) a first circuit to detect whether contents of the store address buffer match an address in a first processing stage, (ii) a second circuit to detect whether contents of the store address buffer match an address in a second processing stage, (iii) a third circuit to detect whether contents of the store address buffer match an address in a third processing stage, and (iv) an OR gate coupled to the first circuit, tire second circuit and the third circuit.

11. The microprocessor claim 10, wherein the store address buffer contains at least two line addresses.

12. The microprocessor of claim 10, wherein the logic circuitry is able to invalidate and reload the information propagating through the first front-end pipeline and the second front-end pipeline.

13. The microprocessor of claim 10, wherein the first circuit of the comparison circuit includes a plurality of comparators, each comparing the address to one of the plurality of addresses.

14. The microprocessor of claim 13, wherein the second circuit includes a comparator, a logic gate functioning as a four-input AND gate and an inverter.

15. A circuit comprising:
a storage element to contain a plurality of addresses associated with executed store instructions progressing through a first instruction pipeline, the storage element located in a second institution pipeline includes a store address buffer, and a comparison circuit to compare whether one of the plurality of addresses matches an address associated with an instruction propagating through staged circuitry to determine whether a self-modifying code (SMC) conflict has occurred, the comparison circuit comprises (i) a first circuit to detect whether contents of the store address buffer match an address in a first processing stage, (ii) a second circuit to detect whether contents of the store address buffer match an address in a second processing stage, (iii) a third circuit to detect whether contents of the store address buffer match an address in a third processing stage, and (iv) an OR gate coupled to the first circuit, the second circuit and the third circuit.

16. The circuit of claim 15, wherein the first circuit of the comparison circuit includes a plurality of comparators, each comparator comparing the address to one of the plurality of addresses contained in the store address buffer.

17. The circuit of claim 15, wherein the second circuit includes a comparator, a logic gate functioning as a four-input AND gate and an inverter.

18. An electronic system comprising:
a bus; and
a electronic device coupled to the bus, the electronic device including
a first storage element,
first circuitry staged for providing a first pipeline including a first front-end pipeline and a first back-end pipeline, an address associated with a store instruction executed by the first circuitry is loaded into the first storage element, and
second circuitry staged for providing a second pipeline including a second front-end pipeline and a second back-end pipeline, the second circuitry to compare the address loaded into the first storage element with an address propagating through the second front-end pipeline and to flush a portion of information propagating through both the first front-end pipeline and the second front-end pipeline if the at least one address matches the address propagating through the second front-end pipeline.

19. The electronic system of claim 18, wherein the first storage element is located in the second back-end pipeline.

20. The electronic system of claim 18, wherein loading three addresses associated with store instructions executed by the first circuitry into the first storage element.

21. A method comprising:
determining if a store address associated with a first instruction being executed in a back-end of a first instruction pipeline matches information progressing through a front-end of the first instruction pipeline, the information identifying at least one address associated with a second instruction progressing through a front-end of first instruction pipeline, the determining if the store address matches the inflation comprises
storing, in a front-end of a second instruction pipeline, the information,
comparing the store address to the information stored in the front-end of the second instruction pipeline to determine if a match occurs,
storing, in a back-end of the second instruction pipeline, at least the store address, and
comparing the store address stored in the back-end of the second insertion pipeline with the information stored in the front-end of the second instruction pipeline to determine if a match occurs; and flushing a portion the first instruction pipeline if a match occurs, the portion being selected from the front-end of the fiat instruction pipeline.

22. The method of claim 21, further comprising:
storing at least three store addresses of instructions being executed in the back-end of the first instruction pipeline in a buffer located in a back-end of a second instruction pipeline, the buffer being a first-in, first-out buffer; and
comparing the at least three store addresses stored in the back-end of the second instruction pipeline to determine if a match occurs.

23. The method of claim 22, wherein the buffer is a 3-deep first-in, first-out buffer.

24. A method of claim 23, wherein the buffer is a first-in, first-out buffer and stores at least two store addresses, the method further comprising:
comparing store addresses other than the first store address stored in the first-in, first-out buffer to the information in the front-end of the second instruction pipeline to determine if a match occurs.

25. A method comprising:
transferring a first store address of an instruction being executed in a back-end of a first instruction pipeline to a back-end of a second instruction pipeline, the first store address being stored in a buffer located in the back-end of the second instruction pipeline;
storing, in a front-end of the second instruction pipeline, information corresponding to instructions progressing though a front-end of the first instruction pipeline;
comparing the first store address in the buffer to the information in the front-end of the second instruction pipeline to determine if a match occurs; and
flushing a portion the first instruction pipeline if a match occurs, the portion being selected from the front-end of the first instruction pipeline.

* * * * *

UNITED STATES PATENT AND TRADEMARK OFFICE
CERTIFICATE OF CORRECTION

PATENT NO.   : 6,405,307 B1
DATED        : June 11, 2002
INVENTOR(S)  : Murty et al.

It is certified that error appears in the above-identified patent and that said Letters Patent is hereby corrected as shown below:

Column 3,
Line 67, delete "WVE" and insert -- IVE --.

Column 5,
Line 41, delete "active,430 indicates" and insert -- active, indicates --.

Column 7,
Line 57, delete "WVE" and insert -- IVE --.

Column 8,
Line 8, delete "based on IP" and insert -- based on IP "A". --.

Column 9,
Line 5, delete "lps." and insert -- IPs. --.
Line 10, delete "WVE" and insert -- IVE --.
Line 14, delete "EM/WE" and insert -- EM/IVE --.
Line 20, delete "t⟩ 1" and insert -- t≥ 1 --.

Signed and Sealed this

Nineteenth Day of November, 2002

*Attest:*

JAMES E. ROGAN
*Attesting Officer*   *Director of the United States Patent and Trademark Office*